US012159626B2

(12) United States Patent
Coucke et al.

(10) Patent No.: US 12,159,626 B2
(45) Date of Patent: *Dec. 3, 2024

(54) DILATED CONVOLUTIONS AND GATING FOR EFFICIENT KEYWORD SPOTTING

(71) Applicant: SONOS VOX FRANCE SAS, Paris (FR)

(72) Inventors: Alice Coucke, Paris (FR); Mohammed Chlieh, Paris (FR); Thibault Gisselbrecht, Paris (FR); David Leroy, Paris (FR); Mathieu Poumeyrol, Paris (FR); Thibaut Lavril, Paris (FR)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,941

(22) Filed: Aug. 28, 2023

(65) Prior Publication Data
US 2024/0062747 A1 Feb. 22, 2024

Related U.S. Application Data

(63) Continuation of application No. 17/549,253, filed on Dec. 13, 2021, now Pat. No. 11,741,948, which is a
(Continued)

(30) Foreign Application Priority Data
Nov. 15, 2018 (EP) .................. 18306501

(51) Int. Cl.
G10L 15/16 (2006.01)
G10L 15/06 (2013.01)
(Continued)

(52) U.S. Cl.
CPC ............ *G10L 15/16* (2013.01); *G10L 15/063* (2013.01); *G10L 15/22* (2013.01); *G10L 2015/088* (2013.01)

(58) Field of Classification Search
CPC ....... G10L 15/16; G10L 15/063; G10L 15/22; G10L 2015/088
See application file for complete search history.

(56) References Cited

U.S. PATENT DOCUMENTS

| 999,715 A | 8/1911 | Gundersen |
| 5,717,768 A | 2/1998 | Laroche |

(Continued)

FOREIGN PATENT DOCUMENTS

| CN | 1748250 A | 3/2006 |
| CN | 1781291 A | 5/2006 |

(Continued)

OTHER PUBLICATIONS

Advisory Action mailed on Nov. 7, 2022, issued in connection with U.S. Appl. No. 16/168,389, filed Oct. 23, 2018, 4 pages.
(Continued)

Primary Examiner — Mohammad K Islam

(57) ABSTRACT

A method for detection of a keyword in a continuous stream of audio signal, by using a dilated convolutional neural network, implemented by one or more computers embedded on a device, the dilated convolutional network comprising a plurality of dilation layers, including an input layer and an output layer, each layer of the plurality of dilation layers comprising gated activation units, and skip-connections to the output layer, the dilated convolutional network being configured to generate an output detection signal when a predetermined keyword is present in the continuous stream of audio signal, the generation of the output detection signal being based on a sequence of successive measurements provided to the input layer, each successive measurement of the sequence being measured on a corresponding frame from
(Continued)

a sequence of successive frames extracted from the continuous stream of audio signal, at a plurality of successive time steps.

20 Claims, 2 Drawing Sheets

Related U.S. Application Data continuation of application No. 16/685,135, filed on Nov. 15, 2019, now Pat. No. 11,200,889.

(51) Int. Cl.
    *G10L 15/08*     (2006.01)
    *G10L 15/22*     (2006.01)

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 7,516,068 B1 | 4/2009 | Clark |
| 7,705,565 B2 | 4/2010 | Patino et al. |
| 8,325,909 B2 | 12/2012 | Tashev et al. |
| 8,489,398 B1 | 7/2013 | Gruenstein |
| 8,594,320 B2 | 11/2013 | Faller |
| 8,620,232 B2 | 12/2013 | Helsloot |
| 8,639,214 B1 | 1/2014 | Fujisaki |
| 8,676,273 B1 | 3/2014 | Fujisaki |
| 8,762,156 B2 | 6/2014 | Chen |
| 8,768,712 B1 | 7/2014 | Sharifi |
| 8,898,063 B1 | 11/2014 | Sykes et al. |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,183,845 B1 | 11/2015 | Gopalakrishnan et al. |
| 9,313,317 B1 | 4/2016 | Lebeau et al. |
| 9,354,687 B2 | 5/2016 | Bansal et al. |
| 9,491,033 B1 | 11/2016 | Soyannwo et al. |
| 9,514,747 B1 | 12/2016 | Bisani et al. |
| 9,542,941 B1 | 1/2017 | Weksler et al. |
| 9,558,755 B1 | 1/2017 | Laroche et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,706,320 B2 | 7/2017 | Starobin et al. |
| 9,749,738 B1 | 8/2017 | Adsumilli et al. |
| 9,756,422 B2 | 9/2017 | Paquier et al. |
| 9,767,786 B2 | 9/2017 | Starobin et al. |
| 9,781,532 B2 | 10/2017 | Sheen |
| 9,799,330 B2 | 10/2017 | Nemala et al. |
| 9,812,128 B2 | 11/2017 | Mixter et al. |
| 9,898,250 B1 | 2/2018 | Williams et al. |
| 9,899,021 B1 | 2/2018 | Vitaladevuni et al. |
| 10,028,069 B1 | 7/2018 | Lang |
| 10,038,419 B1 | 7/2018 | Elliot et al. |
| 10,134,398 B2 | 11/2018 | Sharifi |
| 10,157,042 B1 | 12/2018 | Jayakumar et al. |
| 10,186,276 B2 | 1/2019 | Dewasurendra et al. |
| 10,204,624 B1 | 2/2019 | Knudson et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,332,508 B1 | 6/2019 | Hoffmeister |
| 10,424,296 B2 | 9/2019 | Penilla et al. |
| 10,565,999 B2 | 1/2020 | Wilberding |
| 10,567,515 B1 | 2/2020 | Bao |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,699,711 B2 | 6/2020 | Reilly |
| 10,720,173 B2 | 7/2020 | Freeman et al. |
| 10,735,870 B2 | 8/2020 | Ballande et al. |
| 10,746,840 B1 | 8/2020 | Barton et al. |
| 10,789,041 B2 | 9/2020 | Kim et al. |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,847,164 B2 | 11/2020 | Wilberding |
| 10,867,604 B2 | 12/2020 | Smith et al. |
| 10,871,943 B1 | 12/2020 | D'Amato et al. |
| 10,878,811 B2 | 12/2020 | Smith et al. |
| 10,885,091 B1 | 1/2021 | Meng et al. |
| 10,964,314 B2 | 3/2021 | Jazi et al. |
| 11,024,311 B2 | 6/2021 | Mixter et al. |
| 11,025,569 B2 | 6/2021 | Lind et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,184,969 B2 | 11/2021 | Lang |
| 11,206,052 B1 | 12/2021 | Park et al. |
| 11,212,612 B2 | 12/2021 | Lang et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | MacKay et al. |
| 11,445,301 B2 | 9/2022 | Park et al. |
| 11,475,899 B2 | 10/2022 | Lesso |
| 11,514,898 B2 | 11/2022 | Millington |
| 11,531,520 B2 | 11/2022 | Wilberding |
| 2002/0054685 A1 | 5/2002 | Avendano et al. |
| 2002/0055950 A1 | 5/2002 | Witteman |
| 2002/0143532 A1 | 10/2002 | McLean et al. |
| 2003/0097482 A1 | 5/2003 | DeHart et al. |
| 2004/0153321 A1 | 8/2004 | Chung et al. |
| 2004/0161082 A1 | 8/2004 | Brown et al. |
| 2006/0104454 A1 | 5/2006 | Guitarte Perez et al. |
| 2007/0038461 A1 | 2/2007 | Abbott et al. |
| 2008/0160977 A1 | 7/2008 | Ahmaniemi et al. |
| 2008/0192946 A1 | 8/2008 | Faller |
| 2008/0291916 A1 | 11/2008 | Xiong et al. |
| 2009/0013255 A1 | 1/2009 | Yuschik et al. |
| 2009/0113053 A1 | 4/2009 | Van Wie et al. |
| 2009/0214048 A1 | 8/2009 | Stokes, III et al. |
| 2009/0299745 A1 | 12/2009 | Kennewick et al. |
| 2009/0323924 A1 | 12/2009 | Tashev et al. |
| 2010/0070276 A1 | 3/2010 | Wasserblat et al. |
| 2010/0260348 A1 | 10/2010 | Bhow et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0176687 A1 | 7/2011 | Birkenes |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0265528 A1 | 10/2012 | Gruber et al. |
| 2013/0073293 A1 | 3/2013 | Jang et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |

(56) References Cited

U.S. PATENT DOCUMENTS

| | | | |
|---|---|---|---|
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2014/0056435 A1 | 2/2014 | Kjems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0159581 A1 | 6/2014 | Pruemmer et al. |
| 2014/0161263 A1 | 6/2014 | Koishida et al. |
| 2014/0167929 A1 | 6/2014 | Shim et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0278343 A1 | 9/2014 | Tran |
| 2014/0288686 A1 | 9/2014 | Sant et al. |
| 2014/0328490 A1 | 11/2014 | Mohammad et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0073807 A1 | 3/2015 | Kumar |
| 2015/0126255 A1 | 5/2015 | Yang et al. |
| 2015/0154953 A1 | 6/2015 | Bapat et al. |
| 2015/0221307 A1 | 8/2015 | Shah et al. |
| 2015/0373100 A1 | 12/2015 | Kravets et al. |
| 2015/0380010 A1 | 12/2015 | Srinivasan |
| 2015/0382128 A1 | 12/2015 | Ridihalgh et al. |
| 2016/0014536 A1 | 1/2016 | Sheen |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0118048 A1 | 4/2016 | Heide |
| 2016/0134924 A1 | 5/2016 | Bush et al. |
| 2016/0148612 A1 | 5/2016 | Guo et al. |
| 2016/0212488 A1 | 7/2016 | Os et al. |
| 2016/0283841 A1* | 9/2016 | Sainath .................. G10L 15/16 |
| 2016/0299737 A1 | 10/2016 | Clayton et al. |
| 2016/0335485 A1 | 11/2016 | Kim |
| 2016/0379635 A1 | 12/2016 | Page |
| 2017/0083606 A1 | 3/2017 | Mohan |
| 2017/0084278 A1 | 3/2017 | Jung |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0269900 A1 | 9/2017 | Triplett |
| 2017/0300289 A1 | 10/2017 | Gattis |
| 2017/0329397 A1 | 11/2017 | Lin |
| 2017/0332035 A1 | 11/2017 | Shah et al. |
| 2017/0357390 A1 | 12/2017 | Alonso Ruiz et al. |
| 2017/0365247 A1 | 12/2017 | Ushakov |
| 2018/0012077 A1 | 1/2018 | Laska et al. |
| 2018/0033429 A1 | 2/2018 | Makke et al. |
| 2018/0061409 A1 | 3/2018 | Valentine et al. |
| 2018/0096678 A1 | 4/2018 | Zhou et al. |
| 2018/0120947 A1 | 5/2018 | Wells et al. |
| 2018/0137857 A1 | 5/2018 | Zhou et al. |
| 2018/0139512 A1 | 5/2018 | Moran et al. |
| 2018/0182410 A1 | 6/2018 | Kaskari et al. |
| 2018/0196776 A1 | 7/2018 | Hershko et al. |
| 2018/0199130 A1 | 7/2018 | Jaffe et al. |
| 2018/0270573 A1 | 9/2018 | Lang et al. |
| 2018/0270575 A1 | 9/2018 | Akutagawa |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0035404 A1 | 1/2019 | Gabel et al. |
| 2019/0037173 A1 | 1/2019 | Lee |
| 2019/0044745 A1 | 2/2019 | Knudson et al. |
| 2019/0051299 A1 | 2/2019 | Ossowski et al. |
| 2019/0066680 A1 | 2/2019 | Woo et al. |
| 2019/0066710 A1 | 2/2019 | Bryan et al. |
| 2019/0073999 A1 | 3/2019 | Prémont et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371329 A1 | 12/2019 | D'Souza et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0066279 A1 | 2/2020 | Kang et al. |
| 2020/0075018 A1 | 3/2020 | Chen |
| 2020/0105256 A1* | 4/2020 | Fainberg ................. G10L 15/16 |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0244650 A1 | 7/2020 | Burris et al. |
| 2020/0265842 A1 | 8/2020 | Singh |
| 2020/0336846 A1* | 10/2020 | Rohde ..................... G10L 25/78 |
| 2020/0342869 A1 | 10/2020 | Lee et al. |
| 2020/0409926 A1 | 12/2020 | Srinivasan et al. |
| 2021/0029452 A1 | 1/2021 | Tsoi et al. |
| 2021/0118429 A1* | 4/2021 | Shan ...................... G10L 15/02 |
| 2021/0118439 A1 | 4/2021 | Schillmoeller et al. |
| 2021/0249004 A1 | 8/2021 | Smith |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |
| 2023/0019595 A1 | 1/2023 | Smith |

FOREIGN PATENT DOCUMENTS

| | | |
|---|---|---|
| CN | 101427154 A | 5/2009 |
| CN | 102999161 A | 3/2013 |
| CN | 104155938 A | 11/2014 |
| CN | 104572009 A | 4/2015 |
| CN | 104581510 A | 4/2015 |
| CN | 104885406 A | 9/2015 |
| CN | 104885438 A | 9/2015 |
| CN | 105101083 A | 11/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |

(56) References Cited

FOREIGN PATENT DOCUMENTS

| | | | |
|---|---|---|---|
| CN | 106796784 A | 5/2017 | |
| CN | 106910500 A | 6/2017 | |
| CN | 107122158 A | 9/2017 | |
| CN | 107465974 A | 12/2017 | |
| CN | 107644313 A | 1/2018 | |
| CN | 107767863 A | 3/2018 | |
| CN | 107832837 A | 3/2018 | |
| CN | 107919116 A | 4/2018 | |
| CN | 108198548 A | 6/2018 | |
| EP | 3142107 A1 | 3/2017 | |
| GB | 2501367 A | 10/2013 | |
| JP | 2004096520 A | 3/2004 | |
| JP | 2004109361 A | 4/2004 | |
| JP | 2004163590 A | 6/2004 | |
| JP | 2007235875 A | 9/2007 | |
| JP | 2008217444 A | 9/2008 | |
| JP | 2014510481 A | 4/2014 | |
| JP | 2016009193 A | 1/2016 | |
| JP | 2019109510 A | 7/2019 | |
| KR | 101284134 B1 | 7/2013 | |
| TW | 201629950 A | 8/2016 | |
| WO | 2008096414 A1 | 8/2008 | |
| WO | 2015133022 A1 | 9/2015 | |
| WO | 2015195216 A1 | 12/2015 | |
| WO | 2016003509 A1 | 1/2016 | |
| WO | 2016136062 A1 | 9/2016 | |
| WO | 2018140777 A1 | 8/2018 | |
| WO | 2019005772 A1 | 1/2019 | |
| WO | 2020068795 A1 | 4/2020 | |
| WO | 2020132298 A1 | 6/2020 | |

OTHER PUBLICATIONS

Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 31, 2023, issued in connection with Australian Application No. 2023203687, 2 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Jun. 7, 2022, issued in connection with Canadian Application No. 3105494, 5 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Sep. 6, 2023, issued in connection with Chinese Application No. 202010179593.8, 14 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Oct. 12, 2023, issued in connection with European Application No. 20736489.4, 8 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 29, 2023, issued in connection with European Application No. 22182193.7, 4 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.

(56) References Cited

OTHER PUBLICATIONS

European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2022, issued in connection with European Application No. 22182193.7, 8 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.
European Patent Office, European Extended Search Report mailed on Jul. 8, 2022, issued in connection with European Application No. 22153523.0, 9 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Summons to Attend Oral Proceedings mailed on Jul. 15, 2022, issued in connection with European Application No. 17792272.1, 11 pages.
Final Office Action mailed on Aug. 17, 2022, issued in connection with U.S. Appl. No. 16/179,779, filed Nov. 2, 2018, 26 pages.
Final Office Action mailed on May 17, 2023, issued in connection with U.S. Appl. No. 16/168,389, filed Oct. 23, 2018, 44 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Nov. 21, 2023, issued in connection with U.S. Appl. No. 18/088,976, filed Dec. 27, 2022, 9 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Feb. 27, 2023, issued in connection with U.S. Appl. No. 17/493,430, filed Oct. 4, 2021, 17 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Oct. 6, 2023, issued in connection with U.S. Appl. No. 17/222,950, filed Apr. 5, 2021, 9 pages.
Non-Final Office Action mailed on Feb. 7, 2023, issued in connection with U.S. Appl. No. 17/303,001, filed May 18, 2021, 8 pages.
Non-Final Office Action mailed on Jun. 7, 2023, issued in connection with U.S. Appl. No. 16/179,779, filed Nov. 2, 2018, 29 pages.
Non-Final Office Action mailed on Sep. 7, 2023, issued in connection with U.S. Appl. No. 17/340,590, filed Jun. 7, 2021, 18 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Jul. 10, 2023, issued in connection with U.S. Appl. No. 17/315,599, filed May 10, 2021, 2 pages.
Notice of Allowance mailed on Aug. 11, 2023, issued in connection with U.S. Appl. No. 17/878,649, filed Aug. 1, 2022, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.

(56) References Cited

OTHER PUBLICATIONS

Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Sep. 15, 2022, issued in connection with U.S. Appl. No. 16/736,725, filed on Jan. 1, 2020, 11 pages.
Notice of Allowance mailed on Aug. 16, 2023, issued in connection with U.S. Appl. No. 17/536,572, filed Nov. 29, 2021, 7 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Oct. 2, 2023, issued in connection with U.S. Appl. No. 17/810,533, filed Jul. 1, 2022, 8 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Mar. 20, 2023, issued in connection with U.S. Appl. No. 17/562,412, filed Dec. 27, 2021, 9 pages.
Notice of Allowance mailed on Aug. 21, 2023, issued in connection with U.S. Appl. No. 17/548,921, filed Dec. 13, 2021, 10 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Feb. 23, 2023, issued in connection with U.S. Appl. No. 17/532,674, filed Nov. 22, 2021, 10 pages.
Notice of Allowance mailed on Nov. 24, 2023, issued in connection with U.S. Appl. No. 18/070,024, filed Nov. 28, 2022, 7 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Notice of Allowance mailed on Sep. 29, 2023, issued in connection with U.S. Appl. No. 16/168,389, filed Oct. 23, 2018, 11 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Nov. 8, 2023, issued in connection with U.S. Appl. No. 18/066,093, filed Dec. 14, 2022, 11 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
Final Office Action mailed on Aug. 25, 2023, issued in connection with U.S. Appl. No. 16/989,350, filed Aug. 10, 2020, 21 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Oct. 6, 2023, issued in connection with U.S. Appl. No. 17/532,744, filed Nov. 22, 2021, 21 pages.
Final Office Action mailed on Aug. 9, 2023, issued in connection with U.S. Appl. No. 17/493,430, filed Oct. 4, 2021, 19 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No.

(56) References Cited

OTHER PUBLICATIONS

4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
International Bureau, International Preliminary Report on Patentability, mailed on Jul. 21, 2022, issued in connection with International Application No. PCT/US2021/070007, filed on Jan. 6, 2021, 8 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Office Action and Translation mailed on Feb. 27, 2023, issued in connection with Korean Application No. 10-2022-7021879, 5 pages.
Mathias Wolfel. Channel Selection by Class Separability Measures for Automatic Transcriptions on Distant Microphones, Interspeech 2007 10.21437/Interspeech.2007-255, 4 pages.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Aug. 10, 2023, issued in connection with U.S. Appl. No. 18/070,024, filed Nov. 28, 2022, 4 pages.
Non-Final Office Action mailed on Apr. 12, 2023, issued in connection with U.S. Appl. No. 17/878,649, filed Aug. 1, 2022, 16 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Non-Final Office Action mailed on Apr. 20, 2023, issued in connection with U.S. Appl. No. 18/061,570, filed Dec. 5, 2022, 12 pages.

\* cited by examiner

DILATED CONVOLUTIONS AND GATING FOR EFFICIENT KEYWORD SPOTTING

CROSS REFERENCE TO RELATED APPLICATIONS

This application claims priority as a continuation under 35 U.S.C. § 120 to U.S. application Ser. No. 17/549,253 filed on Dec. 13, 2021, which is a continuation of Ser. No. 16/685,135, filed on Nov. 15, 2019, which claims priority under 35 U.S.C. § 119 to following Europe Patent Application No. 18306501.0, filed on Nov. 15, 2018, the contents of each of which are incorporated herein by reference in their entireties.

TECHNICAL FIELD OF THE INVENTION

This invention relates to the field of using neural networks to automatically recognize speech, and, more precisely, to automatically detect pre-defined keywords in a continuous stream of audio signal.

BACKGROUND

Traditional approaches to keyword spotting either require important memory resources and fail at capturing large patterns with reasonably small models, or require such important computational resources that they cannot be implemented on a low-resource device.

Therefore, there is a need for an effective on-device keyword spotting method, providing real-time response and high accuracy for good user experience, while limiting memory footprint and computational cost.

SUMMARY OF THE INVENTION

The present invention provides a method for detection of a keyword in a continuous stream of audio signal, by using a dilated convolutional neural network, implemented by one or more computers embedded on a device, the dilated convolutional network comprising a plurality of dilation layers, including an input layer and an output layer, each layer of the plurality of dilation layers comprising gated activation units, and skip-connections to the output layer, the dilated convolutional network being configured to generate an output detection signal when a predetermined keyword is present in the continuous stream of audio signal, the generation of the output detection signal being based on a sequence of successive measurements provided to the input layer, each successive measurement of the sequence being measured on a corresponding frame from a sequence of successive frames extracted from the continuous stream of audio signal, at a plurality of successive time steps.

According to these provisions, it is possible to embed on a low power and performance limited device the necessary computation and memory resources to implement a dilated convolutional network and use it for keyword detection applications.

According to an embodiment, the invention comprises one or more of the following features, alone or in combination.

According to an embodiment, the dilation convolutional neural network comprises 24 layers.

According to an embodiment, the successive measurements are acoustic features measured on successive frames extracted from the audio stream every 10 ms, each frame having a 25 ms duration.

According to an embodiment, the acoustic features measured on successive frames are 20 dimensional log-Mel filterbank energies.

According to an embodiment, the dilated convolutional neural network is configured to compute, at a time step, a dilated convolution based on a convolution kernel for each dilation layer, and to put in a cache memory the result of the computation at the time step, so that, at a next time step, the result of the computation is used to compute a new dilated convolution based on a shifted convolution kernel for each dilation layer.

According to these provisions, using the result of the computation at a time to compute the dilation convolution at a next time allows reducing the amount of floating point operations per second to a level compatible with the requirement of embedding the computer implemented dilated convolutional neural network on a small device.

According to another aspect, the invention provides a computer implemented method for training a dilated convolutional neural network, the dilated convolutional neural network being implemented by one or more computers embedded on a device, for keyword detection in a continuous stream of audio signal, the method comprising a data set preparation phase followed by a training phase based on the result of the data set preparation phase, the data set preparation phase comprising a labelling step comprises a step of associating a first label to successive frames which occur inside a predetermined time period centred on a time step at which an end of the keyword occurs, and in associating a second label to frames occurring outside the predetermined time period and inside a positive audio sample containing a formulation of the keyword, the positive audio samples comprising a first sequence of frames, the frames of the first sequence of frames occurring at successive time steps in between the beginning of the positive audio sample and the end of the positive audio sample.

According to an embodiment, the invention comprises one or more of the following features, alone or in combination.

According to an embodiment, the labelling step further comprises a step of associating the second label to frames inside a negative audio sample not containing a formulation of the keyword, the negative audio sample comprising a second sequence of frames, the frames of the second sequence of frames occurring at successive time steps in between a beginning time step of the positive audio sample and an ending time step of the positive audio sample.

According to these provisions, it is possible to train a more accurate model, and therefore more accurate detection results when using the computer implemented dilated convolutional network (DCNN) for keyword detection.

According to an embodiment the first label is a 1, and the second label is a 0.

According to an embodiment, the end of the keyword is detected using a voice activity detection computer implemented algorithm.

According to an embodiment, a width of the predetermined time period is optimised during a further step of validation based on a set of validation data.

According to an embodiment, during the training phase, the training of the dilated convolutional neural network is configured to learn only from the frames included in the second sequence of frames and from the frames which are associated to the first label and which are included in the first sequence of frames, and not to learn from the frames which are included in the first sequence frames and which are associated to the second label.

According to these provisions, the efficiency of the method is further improved, allowing even better accuracy in the model, and better accuracy in the detection results when using the computer implemented dilated convolutional network (DCNN) for keyword detection.

According to another aspect, the invention provides a method for detection of a keyword in a continuous stream of audio signal, by using a dilated convolutional neural network, implemented by one or more computers embedded on a device, the dilated convolutional network comprising a plurality of dilation layers, including an input layer and an output layer, each layer of the plurality of dilation layers comprising gated activation units, and skip-connections to the output layer, the dilated convolutional network being configured to generate an output detection signal when a predetermined keyword is present in the continuous stream of audio signal, the generation of the output detection signal being based on a sequence of successive measurements provided to the input layer, each successive measurement of the sequence being measured on a corresponding frame from a sequence of successive frames extracted from the continuous stream of audio signal, at a plurality of successive time steps, wherein the dilated convolutional network is trained according to the computer implemented method for training a dilated convolutional neural network, of the invention.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which the same reference refer to similar elements or to elements having similar functions, and in which.

DETAILED DESCRIPTION OF THE INVENTION ACCORDING TO AN EMBODIMENT

An embodiment of a computer implemented method for keyword detection in a continuous stream of audio signal, using a computer implemented dilated convolutional network, will be described in reference to FIGS. 1 and 2.

Figure 1:
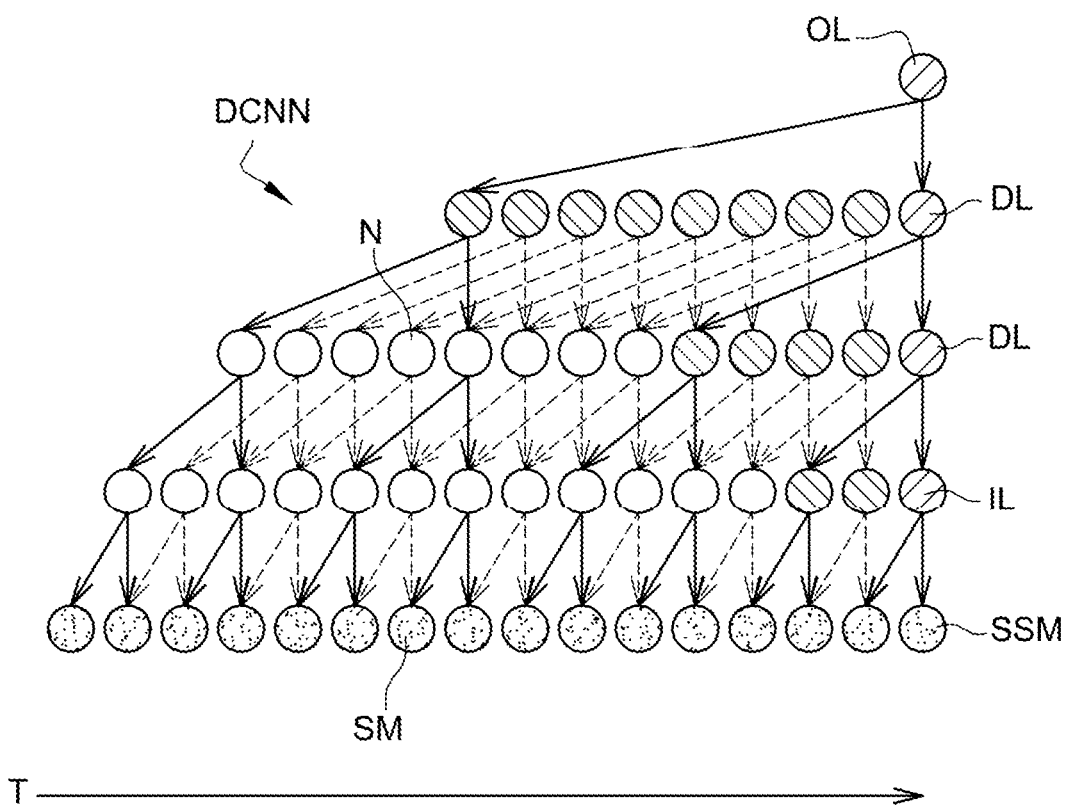
FIG. 1 schematically represents a view of an embodiment of a dilated convolutional neural network at a given time step.

According to an embodiment illustrated in FIG. 1, a continuous audio-stream is fragmented into a sequence SSM of successive measurements SM, each successive measurement SM resulting from the measurement of one or more acoustic features on a frame extracted from the continuous audio stream. According to an embodiment, the acoustic features are 20 dimensional log-Mel filterbank energies measured on successive frames extracted from the audio stream every 10 ms, each frame having a 25 ms duration.

As illustrated in FIG. 1, the sequence SSM of successive measurements SM is provided as an input to a computer implemented dilated convolutional neural network DCNN.

FIG. 1 illustrates the configuration at a given time step of the inference process for keyword detection, with a given number of successive measurements SM being provided as input to the dilated convolutional neural network DCNN. At a next time step of the inference process for keyword detection, a new successive measurement SM is introduced in the sequence provided as input, pushing the sequence in the direction opposite to the time direction T represented on FIG. 1, the time direction T being directed towards the future.

According to an embodiment illustrated in FIG. 1, as it is well-known from the one skilled in the art, the computer implemented dilated convolutional network comprises a plurality of dilation layers DL, including an input layer IL and an output layer OL, and it is configured to implement, at each successive time steps of the process, dilated convolution of the sequence SSM of successive measurements SM which is provided, at each given time step of the process, to the input layer IL of the computer implemented dilated convolutional network.

Figure 2:
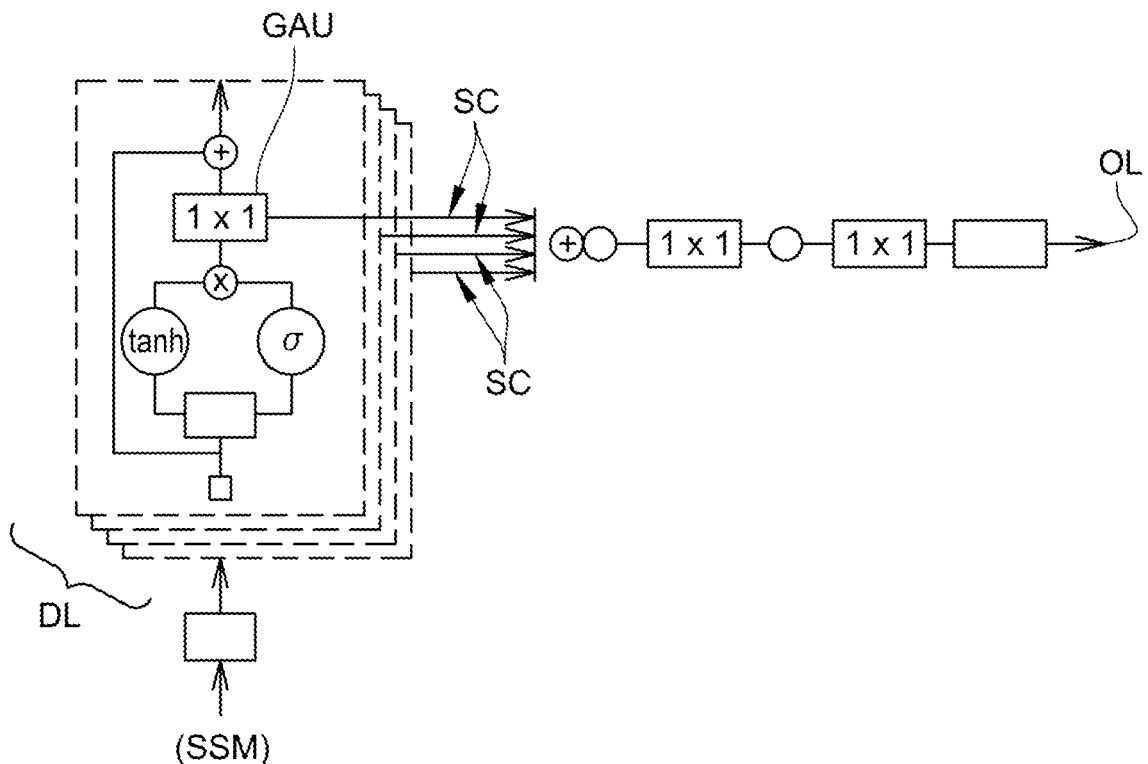
FIG. 2 schematically represents a view of an embodiment of activation gated units and skip-connections for a dilated convolutional neural network.

According to an embodiment illustrated at FIG. 2, as it is well-known from the one skilled in the art, each layer of the plurality of dilation layers DL further comprises gated activation units GAU, and skip-connections SC to the output layer OL.

According to an embodiment of the dilated convolutional network DCNN is configured to generate an output detection signal when a predetermined keyword is present in the continuous stream of audio signal, the generation of the output detection signal being based on the result of the dilated convolution of the sequence SSM of successive measurements SM provided to the input layer IL, the result of the dilated convolution being transformed by operation of gated activation units GAU and of skip-connections SC to contribute to the generation of the output detection signal. Skip connections are introduced to speed up convergence address the issue of vanishing gradients posed by training of models of higher depth. Each layer yields two outputs: one is directly fed to the next layer as usual, but the second one skips it. All skip-connections outputs are then summed into the final output of the network. Without these bypassing strategies, one could not train deeper architectures, as required by the keyword detection application.

The gated activation units are a combination of tanh and sigmoid activations. Sigmoid activation filter acts like a gate for the tanh activation filter, depending on how important is the output of the tanh filter.

The computer implemented dilated convolutional network DCNN is configured to run in a streaming fashion during inference process for detection of keyword. When receiving a new input frame at a next time step, the result of the dilated convolution computation at a previous time step is used to compute a new dilated convolution based on a shifted convolution kernel for each dilation layer. This is possible because convolution kernels of each dilation layer are shifted one time step at a time, or a few time steps at a time, but in any case the "stride", or the number of time steps the kernel is shifted at a time, is usually smaller than the kernel size, so that two subsequent convolution kernels overlap. This cached implementation allows reducing the amount of Floating Point Operations per Second (FLOPS), so that the level of computing resources required by the inference process for keyword detection task is compatible with technical constraints imposed by embedding of the computer implemented dilated convolutional network DCNN on a low power and performance limited device. Indeed, using a dilated convolutional network architecture for keyword detection implies technically dealing with a deeper model dealing with a larger number of parameters, therefore it is important for this specific application to be able to reduce as indicated the amount of FLOPS.

Before using the computer implemented dilation convolutional network DCNN in an inference mode for keyword detection, it is necessary to train the dilation convolutional network DCNN so that it builds an internal model adapted to the keyword (s) to be detected during the inference process.

Figure 3A:
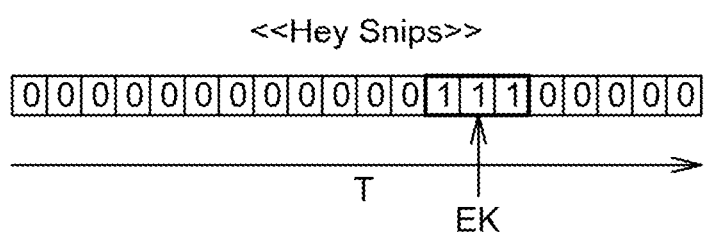
FIGS. 3a and 3b illustrates an embodiment of a labelling method to prepare training data sets.
Figure 3B:
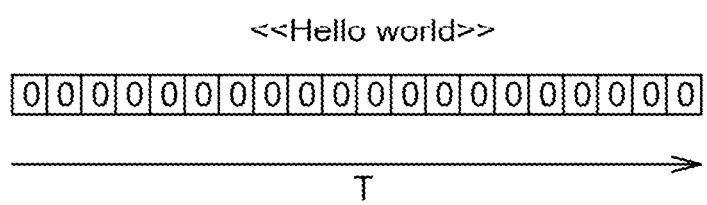

According to an aspect, the invention also relates to a computer implemented method for training a dilated convolutional neural network (DCNN). The method comprises a data set preparation phase, followed by a training phase based on the result of the data set preparation phase, the data set preparation phase comprising the following steps:

collect two sets of training data comprising respectively to types of audio samples of varying duration. A first type of audio samples, that will be denoted positive audio samples, the positive audio samples corresponding to the utterance by someone of the predetermined keyword(s); for example an audio sample corresponding to someone saying the keyword to be detected, "Hey SNIPS" for example, as illustrated in FIG. 3a, with silence at the beginning and the end, will be denoted as "positive sample". A second type of audio samples, that will be denoted negative audio samples, the negative audio samples corresponding to the utterance by someone of a random sentence, "Hello world" for example, as illustrated in FIG. 3b.

to be processed by the computer implemented dilated convolutional network, the audio samples are respectively divided into sequences of successive frames; according to an embodiment, the frames are of 25 ms duration and overlap by 10 ms with the previous and next frames. Each successive frame corresponds to a portion of the audio sample occurring respectively at one of a sequence of successive time steps.

in the sequence of successive frames corresponding to positive audio samples, automatically detect a frame, for example by using a voice activity detection algorithm, the detected frame corresponding to an end EK of the keyword, and associate a first label, 1 for example as illustrated on FIG. 3a, to all successive frames which occur, in the sequence of successive frames, inside a predetermined time period starting before and ending after the occurrence time step of the detected frame, and associate a second label, 0 for example, to each other frame of the sequence of successive frames, corresponding to positive audio samples, which occur outside the predetermined time period.

associate the second label, 0 for example, to each frame of the sequences of successive frames corresponding to negative audio samples, as illustrated on FIG. 3b.

According to these provisions, instead of using an alignment algorithm to find the keyword window that is aligned with the spoken keyword, and to label 1, for example, the frames inside the window, and 0 the frames outside the window, according to the method of the invention, only the frames close to the end of the keyword are labelled 1. The end of the keyword can easily be detected by, for example, a voice activity detection algorithm. Thus, it is possible to train a more accurate model, and therefore to obtain more accurate detection results when using the computer implemented dilated convolutional network DCNN for keyword detection.

In the traditional approach, the model has a tendency to trigger as soon as the keyword starts, whether or not the sample contains only a fraction of the keyword. One advantage of our approach is that the network will trigger near the end EK of keyword, once it has seen enough context.

According to an embodiment of the method, the predetermined time period is centered on the frame corresponding to the end EK of the keyword, the width of the predetermined time period being optimised during a further step of validation tests based on a set of validation data.

According to an embodiment of the method, during the training of the dilated convolutional neural network DCNN, the dilated convolutional neural network DCNN is configured to learn only from the successive frames of the negative audio samples, and from the successive frames of the positive audio samples which are associated to the first label, 1 for example, and not to learn from successive frames of the positive audio samples which are associated to the second label, 0 for example.

According to these provisions, the efficiency of the method is further improved, allowing even better accuracy in the model, and better accuracy in the detection results when using the computer implemented dilated convolutional network DCNN for keyword detection.

The invention claimed is:

1. A computing device comprising:
   at least one processor;
   at least one non-transitory computer-readable medium; and
   program instructions stored on the at least one non-transitory computer-readable medium that are executable by the at least one processor such that the computing device is configured to:
     extract, at a plurality of successive time steps, a sequence of successive frames from a stream of audio signal;
     measure a sequence of successive measurements, each successive measurement of the sequence measured on a corresponding frame from the sequence of successive frames;
     provide the sequence of successive measurements to an input layer of a dilated convolutional neural network (DCNN), wherein the DCNN comprises a plurality of dilation layers including the input layer and an output layer;
     based on the sequence of successive measurements provided to the input layer, detect a presence of a predetermined keyword in the stream of audio signal; and
     based on detecting the presence of the predetermined keyword, generate an output detection signal indicating the presence of the predetermined keyword.

2. The computing device of claim 1, further comprising program instructions that are executable by the at least one processor such that the computing device is configured to:
   compute, via the DCNN at a time step, a dilated convolution based on a respective convolution kernel for each dilation layer of the plurality of dilation layers;
   store a result of the computation at the time step; and
   at a next time step, use the result of the computation to compute, via the DCNN, a new dilated convolution based on a respective shifted convolution kernel for each dilation layer of the plurality of dilation layers.

3. The computing device of claim 1, wherein each frame in the sequence of successive frames has a 25 millisecond duration.

4. The computing device of claim 1, wherein the program instructions that are executable by the at least one processor such that the computing device is configured to measure the sequence of successive measurements comprise program instructions that are executable by the at least one processor such that the computing device is configured to measure acoustic features from the sequence of successive frames extracted from the stream of audio signal.

5. The computing device of claim 4, wherein the program instructions that are executable by the at least one processor such that the computing device is configured to measure the acoustic features from the sequence of successive frames extracted from the stream of audio signal comprise program instructions that are executable by the at least one processor such that the computing device is configured to measure the acoustic features from the sequence of successive frames every 10 milliseconds.

6. The computing device of claim 4, wherein the acoustic features measured from the sequence of successive frames are 20 dimensional log-Mel filterbank energies.

7. The computing device of claim 1, wherein the DCNN comprises 24 dilation layers.

8. A non-transitory computer-readable medium, wherein the non-transitory computer-readable medium is provisioned with program instructions that, when executed by at least one processor, cause a computing device to:
  extract, at a plurality of successive time steps, a sequence of successive frames from a stream of audio signal;
  measure a sequence of successive measurements, each successive measurement of the sequence measured on a corresponding frame from the sequence of successive frames;
  provide the sequence of successive measurements to an input layer of a dilated convolutional neural network (DCNN), wherein the DCNN comprises a plurality of dilation layers including the input layer and an output layer;
  based on the sequence of successive measurements provided to the input layer, detect a presence of a predetermined keyword in the stream of audio signal; and
  based on detecting the presence of the predetermined keyword, generate an output detection signal indicating the presence of the predetermined keyword.

9. The non-transitory computer-readable medium of claim 8, wherein the non-transitory computer-readable medium is also provisioned with program instructions that, when executed by at least one processor, cause the computing device to:
  compute, via the DCNN at a time step, a dilated convolution based on a respective convolution kernel for each dilation layer of the plurality of dilation layers;
  store a result of the computation at the time step; and
  at a next time step, use the result of the computation to compute, via the DCNN, a new dilated convolution based on a respective shifted convolution kernel for each dilation layer of the plurality of dilation layers.

10. The non-transitory computer-readable medium of claim 8, wherein each frame in the sequence of successive frames has a 25 millisecond duration.

11. The non-transitory computer-readable medium of claim 8, wherein the program instructions that, when executed by at least one processor, cause the computing device to measure the sequence of successive measurements comprise program instructions that, when executed by at least one processor, cause the computing device to measure acoustic features from the sequence of successive frames extracted from the stream of audio signal.

12. The non-transitory computer-readable medium of claim 11, wherein the program instructions that, when executed by at least one processor, cause the computing device to measure the acoustic features from the sequence of successive frames extracted from the stream of audio signal comprise program instructions that, when executed by at least one processor, cause the computing device to measure the acoustic features from the sequence of successive frames every 10 milliseconds.

13. The non-transitory computer-readable medium of claim 11, wherein the acoustic features measured from the sequence of successive frames are 20 dimensional log-Mel filterbank energies.

14. The non-transitory computer-readable medium of claim 8, wherein the DCNN comprises 24 dilation layers.

15. A method implemented by a computing device, the method comprising:
  extracting, at a plurality of successive time steps, a sequence of successive frames from a stream of audio signal;
  measuring a sequence of successive measurements, each successive measurement of the sequence measured on a corresponding frame from the sequence of successive frames;
  providing the sequence of successive measurements to an input layer of a dilated convolutional neural network (DCNN), wherein the DCNN comprises a plurality of dilation layers including the input layer and an output layer;
  based on the sequence of successive measurements provided to the input layer, detecting a presence of a predetermined keyword in the stream of audio signal content; and
  based on detecting the presence of the predetermined keyword, generating an output detection signal indicating the presence of the predetermined keyword.

16. The method of claim 15, further comprising:
  computing, via the DCNN at a time step, a dilated convolution based on a respective convolution kernel for each dilation layer of the plurality of dilation layers;
  storing a result of the computation at the time step; and
  at a next time step, using the result of the computation to compute, via the DCNN, a new dilated convolution based on a respective shifted convolution kernel for each dilation layer of the plurality of dilation layers.

17. The method device of claim 16, wherein each frame in the sequence of successive frames has a 25 millisecond duration.

18. The method of claim 15, wherein measuring the sequence of successive measurements comprises measuring acoustic features from the sequence of successive frames extracted from the stream of audio signal.

19. The method of claim 18, wherein measuring the acoustic features from the sequence of successive frames extracted from the stream of audio signal comprises measuring the acoustic features from the sequence of successive frames every 10 milliseconds.

20. The method of claim 18, wherein the acoustic features measured from the sequence of successive frames are 20 dimensional log-Mel filterbank energies.

* * * * *